United States Patent [19]
Hummel

[11] 3,807,014
[45] Apr. 30, 1974

[54] METHOD OF MANUFACTURING PISTONS

[75] Inventor: Hagen Hummel, Weiler, Germany

[73] Assignee: Mahle GmbH, Stuttgart-Bad Connstatt, Germany

[22] Filed: July 31, 1972

[21] Appl. No.: 276,730

[30] Foreign Application Priority Data
May 18, 1971  Germany.....................21245954

[52] U.S. Cl.......................... 29/156.5 R, 123/193 P
[51] Int. Cl........................................... B23p 15/10
[58] Field of Search ............ 29/156.5 R; 123/193 P; 92/172, 208

[56] References Cited
UNITED STATES PATENTS

| | | | |
|---|---|---|---|
| 3,402,644 | 9/1968 | Geiger et al. | 92/224 |
| 3,319,536 | 5/1967 | Kohl et al. | 123/193 P |
| 3,221,722 | 12/1965 | Bachle | 92/222 |
| 3,149,409 | 9/1964 | Maruhn | 123/193 P |

FOREIGN PATENTS OR APPLICATIONS
588,322  5/1947  Great Britain

*Primary Examiner*—Charles W. Lanham
*Assistant Examiner*—D. C. Crane
*Attorney, Agent, or Firm*—William Anthony Drucker

[57] ABSTRACT

A method of manufacturing light metal pistons having a dished combustion chamber arranged in the piston-head. Initially a piston having a cylindrical recess is provided and a charge carrier beam is applied to the piston head in the region of the eventual rim of the combustion chamber. The carrier beam provides two concentric refined remelting seams which overlap by simultaneously causing the carrier beam to oscillate in a direction transverse to the path of the concentric seams. The recess then is machined out to form the dished combustion chamber. The machining operation also removes part of the refined remelting zone provided by the overlapping seams to leave the combustion chamber with a rim composed of the refined remelting zone.

4 Claims, 4 Drawing Figures

PATENTED APR 30 1974   3,807,014

3,807,014

METHOD OF MANUFACTURING PISTONS

BACKGROUND OF THE INVENTION

1. Field of the Invention

The invention relates to a method for producing light metal pistons with a dished combustion chamber arranged in the piston-head.

In such pistons the zone of the piston-head which forms the rim of the dish is alternately and to a particular extent thermally stressed in operation and therefore tends to develop cracks.

2. Description of the Prior Art

It is known to protect this zone against cracking by constructing it in the form of inserts of a heat-resistant metallic or metallo-ceramic material (German O.S. 1,933,520 or G.P. Pat. Spec. No. 588,322). But such inserts increase the weight of the light metal piston and because of their poor heat conductivity they become very hot in use, so that they are capable of heating the surrounding light metal to a temperature at which its tensile strength is much reduced or at which it melts. Moreover, there are difficulties in creating a perfect, strong connection between the insert and the body of the piston. Furthermore, the differing thermal expansions of the two metals again result in tensions. According to the teaching of U.S. Pat. No. 3,402,644, one solution for avoiding these tensions consists in the insertion into the piston-head of a cylindrical ring concentric with the rim of the dish, whereby a balancing counter-tension is supposed to be applied. This solution, however, is very costly.

It is furthermore known to refine materials by remelting by means of charge carrier beams ("Elektronik," No. 5, May 1961, pages 146 to 148). This remelting refining process is based on a charge carrier beam penetrating into the material only melting a very small amount of material lying directly in its range while the metal surrounding the melting zone remains cold and therefore the molten material is severely cooled and immediately solidifies as soon as the charge carrier beam has been removed or has moved on, wherefore the remelted material acquires a very fine-grained structure, high tensile strength and great ductility. Since the remelted material takes up a smaller volume than the material not remelted the workpiece treated by remelting refining contracts slightly, which, as a rule, is acceptable. But if the geometrical shape of the workpiece does not permit the total removal of the tensions by change of configuration high internal stesses may result.

But it is precisely such a geometrical shape, disadvantageous for use in the remelting refining process, that is exhibited by the zone of the piston-head situated in the region of the rim of the dish. This zone is of a continuous configuration which does not provide any possibility of the radial and tangential stresses developing during the remelting refining being removed. It was, therefore, to be expected that high internal stresses would result if the zone around the rim of the dish was to be refined by remelting seams extending parallel to the rim of the combustion chamber dish or spirally about it. Experiments have shown that already four parallel seams result in the internal stresses becoming so great that the rim of the dish is torn. But when, as is customary, a charge carrier beam is used which is only moved parallel to itself in the direction of the seam, then far more than three contiguous seams are needed to completely remelt the zone surrounding the rim of the dish to a width necessary for effective protection, which width is known from experience to amount to about 4 mm.

It is true that the tensions could be reduced by maintaining the piston at an elevated temperature during the remelting refining treatment but the desired effect, i.e., the fine-grained structure of the remelted material caused by the severe cooling would then only partially result. Furthermore, heating the piston is expensive.

Against the use of the remelting refining by means of charge carrier beams at the zone of the piston which surrounds the rim of the dish is the consideration that it is most particularly the zone situated directly at the edge of the combustion chamber which needs to be refined but that beams impinging thereon or exciting would cause crater-like fissures in the rim of the dish.

For all these reasons those skilled in the art have believed until now that one would have to renounce using the remelting refining process at the zone of the piston-head in the region of the rim of the dish, although for a long time there had been an urgent need to protect this zone against cracking and the use of a refined material appeared particularly suitable therefor.

SUMMARY OF THE INVENTION

The invention is based on the problem of devising a method for producing light metal pistons having a dished combustion chamber arranged in the piston-head which method enables the remelting refining by means of charge carrier beams to be used despite the obstacles mentioned.

According to the invention this problem is solved by a method of manufacturing light metal pistons having a dished combustion chamber arranged in the piston-head, including providing a piston having a recess therein constituting the basis of the combustion chamber, applying to the surface of the piston in which said recess is provided a charge carrier beam to produce at least two concentric remelting seams, simultaneously oscillating said charge carrier beam transversely of the path of said seams to allow overlapping of said seams to form a remelting zone and machining said recess to remove part of the piston material and part of the remelting zone, wherein the piston is formed having the dished combustion chamber, the rim of which chamber is defined by the remelting zone.

BRIEF DESCRIPTION OF THE DRAWING

An exemplary embodiment of a piston produced by the method of the invention is illustrated in the drawing.

DESCRIPTION OF THE PREFERRED EMBODIMENT

Figure 1:
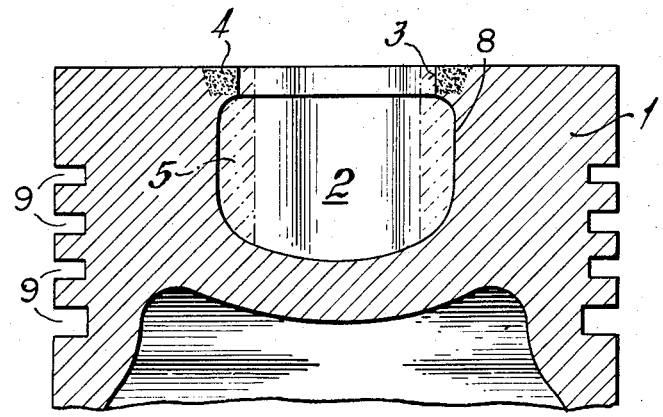
FIG. 1 shows a longitudinal section through the finished piston, the shape which the blank used for producing the piston had in the region of the combustion chamber dish being indicated by broken lines.

Referring now to FIG. 1 there is shown a cross-sectional view of a piston just prior to completion by the method of manufacture according to the present invention.

Figure 2:
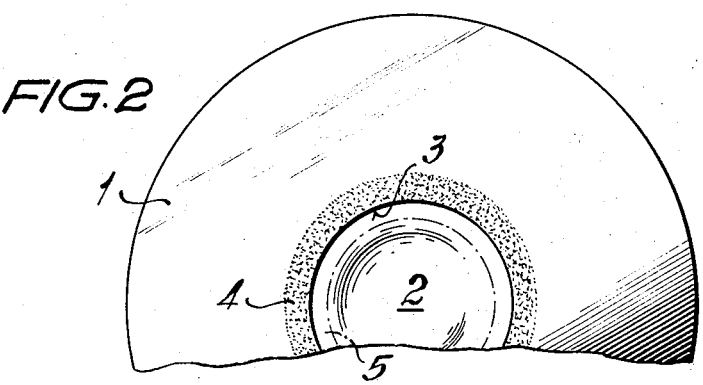
FIG. 2 shows a plan view of the piston of FIG. 1.

In more detail FIGS. 1 and 2 show a piston 1 having a cylindrical bore 2. The wall of the bore 2 is defined by a portion 5 of the piston, which portion is shown by dot-dash shading lines and which will be removed as hereinafter described to leave a combustion chamber having a rim defined by the line 3 and further defined by the continuous line 8. At the top of the piston 1 around the rim 3 is provided a refined remelted zone 4 as hereinafter described.

The manufacture of the piston described above is as follows:

Initially the piston 1 is formed by conventional techniques, such as casting, in the form shown in FIG. 1 without the refined remelted zone but with the cylindrical bore 2. Annular recesses 9 are provided, as known, to receive piston rings therein.

Figure 4:
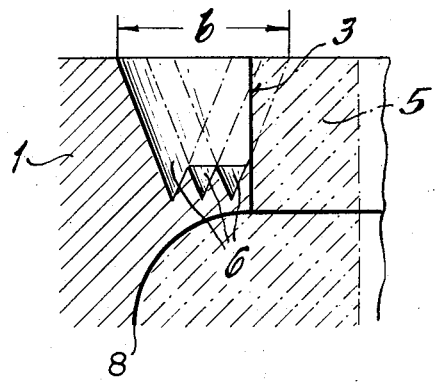
FIG. 4 shows, also schematically and on enlarged scale, a longitudinal section through remelting seams produced by a charge carrier beam oscillating transversely of the seams.

The zone 4 is then formed by applying to the region in which the rim 3 is to be formed, a charge carrier beam to provide three remelting seams. Simultaneously to each circular motion of the carrier beam to provide the circular zone 4 the beam is oscillated back and forth in a direction transverse to the circular motion. The oscillatory motion of the carrier beam being either circular of eliptical. The width $b$ of the remelted zone 4 is illustrated in FIG. 4 and comprises three remelting seams 6 parallel to one another and to the rim 3 of the dished combustion chamber.

Because the charge carrier beam oscillates transversely of the course of the remelting seam a greater area of the material is in the molten state than would be the case with a non-oscillating beam. Thus a larger cross-section for balancing is available to the stresses arising during shrinking, moreover, although the remelted material cools to the same temperature as when a non-oscillating beam is used, it does not do so quite as abruptly.

The width of the refined remelting zone necessary for effective protection, of about 4 mm, is attained, by virtue of the large remelting area of the oscillating beam, already with two or three seams, so that the critical number of seams is not reached.

Figure 3:
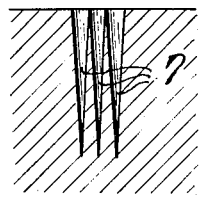
FIG. 3 shows, on enlarged scale and schematically, a longitudinal section through remelting seams produced by a non-oscillating charge carrier beam.

If the remelting had been performed with a charge carrier beam not oscillating transversely of the direction of advance, then only very narrow, pointed seams 7 would have been obtained, as is shown in FIG. 3. Two or three such seams would never have sufficed to melt and refine a sufficiently wide zone, more than three seams would have led to tearing of the rim 3 of the dish.

Having formed the refined remelted zone 4 the portion 5 is now removed, for example by turning, to leave the combustion chamber as defined by the rim line 3 and the continuous line 8. As can be more clearly seen from FIGS. 2 and 4 the turning operation to remove the portion 5 also removes a small part of the refined remelted zone 4 in order to define the rim 3 as indicated. Consequently, a piston is formed in which the refined remelting zone is at the rim of the combustion chamber without the need for added piston inserts, thereby maintaining the piston at the lightest possible weight. Furthermore, since in the process of manufacture part of the zone 4 is removed with the portion 5 the edge of the combustion chamber does not exhibit any fissures after removal.

Therefore, a piston manufactured according to the invention displays a refined zone situated around the rim of the combustion chamber dish which zone has very good ductile and tensile properties combined with a very fine-grained structure, but in which zone the inherent tensions are far below the critical value at which the zone would tear.

Since conventional apparatus for producing charge carrier beams, e.g. electron beam welding machines, are equipped with devices for periodically diverting the charge carrier beam, as is disclosed in "Werkstattstechnik, Vol. 9, 1961, pages 448 to 454," The use of the described and per se known beam guidance requires no additional expenditure.

I claim:

1. A method of manufacturing light metal pistons having a dished combustion chamber arranged in the piston-head, including providing a piston having a recess therein constituting the basis of the combustion chamber, applying to the surface of the piston in which said recess is provided a charge carrier beam to produce at least two concentric remelting seams, simultaneously oscillating said charge carrier beam transversely of the path of said seams to allow overlapping of said seams to form a remelting zone and machining said recess to remove part of the piston material and part of the remelting zone, wherein the piston is formed having the dished combustion chamber, the rim of which chamber is defined by the remelting zone.

2. A method as claimed in claim 1, in which the oscillatory motion of the charge carrier beam is circular.

3. A method as claimed in claim 1, in which the oscillatory motion of the charge carrier is eliptical.

4. A method as claimed in claim 1, in which three concentric remelting seams are provided to form the remelting zone.

* * * * *